United States Patent

[11] 3,632,354

[72] Inventors Robert L. Swaine
Lynnfield;
Anne M. Prendergast, Arlington, both of Mass.
[21] Appl. No. 49,572
[22] Filed June 24, 1970
[45] Patented Jan. 4, 1972
[73] Assignee William C. Clay, Jr.
Mt. Sterling, Ky.
Continuation-in-part of application Ser. No. 471,730, Mar. 13, 1965, now Patent No. 3,525,626. This application June 24, 1970, Ser. No. 49,572

[54] COLA BEVERAGE COMPOSITION AND METHOD OF MAKING
4 Claims, No Drawings
[52] U.S. Cl............................................. 99/78, 99/28
[51] Int. Cl............................................. A23l 1/00

[50] Field of Search............................................. 99/78, 140, 199, 28

[56] References Cited
UNITED STATES PATENTS
3,525,626  8/1970  Swaine et al.................  99/78

*Primary Examiner*—Morris O. Wolk
*Assistant Examiner*—Sidney Marantz
*Attorney*—Seidel, Gonda & Goldhammer ABSTRACT: A dry powder composition which is suitable for blending with heated water to form a hot cola beverage consisting essentially of from 1.40 to 2.34 weight percent of a spray dried cola flavoring, from 0.18 to 0.56 weight percent of vanilla powder, from 0.37 to 1.13 weight percent of anhydrous citric acid, from 2.62 to 4.36 weight percent of powdered caramel color, and from 85 to 95.4 weight percent of sucrose. The components of the powder composition are mixed together in dry form in a conventional blender whereby the usual granulation step, including the evaporation of water or water and alcohol, is eliminated.

COLA BEVERAGE COMPOSITION AND METHOD OF MAKING

This application is a continuation-in-part of copending application Ser. No. 471,730, filed July 13, 1965, now U.S. Pat. No. 3,525,626 issued Aug. 25, 1970 for a "Cola Beverage Composition" assigned to the same assignee as the present invention.

This invention is directed to an improved cola beverage composition, and more particularly to a cola beverage composition which may be served hot. The invention is also directed to an improved method of making a cola beverage composition.

There are a limited number of hot beverages, namely coffee, tea, cocoa, and soups. Most commonly, neither coffee nor tea are served to children. Rather, these beverages are gradually adopted, and their tastes "learned" during the period between 13 and 20 years of age.

Unlike coffee or tea, cola-flavored carbonated beverages are in prevalent use with subteen children. Notwithstanding this, there has never been a successful cola-flavored hot beverage, which would permit children to make the transition from a cola-flavored carbonated cold beverage to a hot beverage, which is analogous to coffee or tea. This transition, if possible, would obviate the necessity for "learning" the taste of coffee or tea.

The reason for the absence of a stationary cola-flavored hot beverage is that the cola flavor is thermally unstable. Thus, the components making up the typical cola flavoring used in carbonated drinks tend to distill off and/or decompose when heated. As a result, the typical cola-flavored carbonated beverage is unpalatable, when heated.

This invention has as an object the provision of a novel cola beverage composition.

This invention has another object the provision of a novel cola beverage composition, which may be stored in a dry powdered form, and which may be admixed with heated water to yield a palatable hot beverage.

The above referred to copending application, Ser. No. 471,730 achieved these objects by mixing a liquid cola flavoring with vanilla powder, extract of kola NF, sucrose, and hydrated citric acid. The components of that invention were mixed in a dry blender at room temperature. It was found, however, that moisture was deleterious to the composition for two reasons, namely it lead to caking, and it also tended to degrade the cola flavor. Therefore, since the cola flavoring was added in liquid form, it was necessary to dry the mixture in a forced air oven, such as by passing air at a temperature of 140° F. over the powder for a period of 1 hour. After this initial drying, the composition was granulated, and then dried for another one-half hour to be sure that all moisture had been removed.

It will be appreciated that the drying and granulation of the composition of the copending application constituted an expensive and time-consuming segment in the manufacture of the composition.

Therefore, it is a further object of the present invention to provide a simplified method of making a dry powdered cola composition, whereby the steps of drying and granulating the composition are eliminated.

The foregoing objects are achieved by the composition of the present invention which comprises a spray dried cola flavoring, vanilla powder, anhydrous citric acid, powdered caramel color, and sucrose. The composition of the present invention is in the form a dry powder which may be stored for protracted periods of time in sealed containers without loss of flavor. The user adds approximately 8 grams for a 6-ounce serving or 11 grams for an 8-ounce serving to hot water, and stirs. The resulting hot cola beverage has a delightful flavor and odor.

A cola flavor, by definition, is a complex flavoring mixture that has in it certain citrus characteristics, such as lemon and lime. In addition, the flavor has definite herby characteristics that are supplied by kola nuts or other botanicals, together with spicy characteristics which are normally supplied by cassia and clove. Finally, there must be some caffeine present to meet the standards of a cola. The caffeine may be present in a very small amount, but is must be there. Characteristic of a cola flavor is the difficulty in picking out any one note, say cassia or lemon or lime. Instead, the consumer perceives a complex impression which he calls "cola." A typical liquid cola flavoring is set forth at page 264 of Food Flavorings by Joseph Merory (Avi Publishing Company, 1960) as MF 212, and is more fully described in the aforementioned copending application.

Now that spray-dried cola flavors have become N.Y. available, we have found that the use of such spray dried flavors instead of liquid cola flavoring can substantially simplify the process of making dry powdered cola compositions. The spray dried cola flavors used in compositions of this invention should be present in the amount of from 1.40 to 2.34 weight percent, and preferably about 1.87 weight percent. A particularly successful, commercially available spray-dried cola flavor is produced by Polak's Frutal Works, Middletown, N.Y. Other suitable spray-dry cola flavors are available from International Flavors and Fragrances, Fritzsche, Dodge and Olcott, and Givaudan Corporation.

The vanilla powder used in the compositions of our invention constitutes the vanilla powder as defined in 21 C.F.R. Section 22.8, as amended, 28 F.R. 9983, effective Dec. 12, 1962. A suitable commercial form of the vanilla powder is available from Food Materials Corporation (No. 5411). The vanilla powder should be present in the concentration of from 0.18 to 0.56 weight percent, with an optimum concentration of 0.37 weight percent.

The anhydrous citric acid should be present in the amount of 0.37 to 1.13 weight percent, and preferably about 0.75 percent.

The sucrose should be present in a range of from 85 to 95.4 weight percent with an optimum concentration of about 93.52 weight percent.

In addition, the composition should be colored with a powdered caramel color, which should be present in the amount of from 2.62 weight percent to 4.36 weight percent, and preferably about 3.49 weight percent.

The compositions of the present invention are prepared by mixing the above ingredients together at room temperature in a conventional dry blender, such as a ribbon or V-type mixer. Since all of the components of the composition are in dry form, an obvious advantage of using spray-dried cola flavors is that it is unnecessary to evaporate water or water and alcohol from a granulation procedure. Other drying steps are similarly obviated. The only critical requirement of the method is that the components be mixed in a relatively dry atmosphere, in order to avoid any undesirable caking which might result from mixing under highly humid conditions.

Due to the elimination of the granulation step each of the components of the composition is present in separate particles throughout the mixture, instead of each particle having a mixture of the components. Therefore, it might be expected that separation problems might result from variation of the component particle sizes. While the relative particle sizes do not appear to be especially critical, a suitable distribution of the particle sizes of the various components is given in table I. Other suitable particle distributions, consistent with minimum separation of the components, will be readily determinable by one skilled in the art.

TABLE I

Particle size distribution of components (weight percent)

| U.S. Standard Sieves | Sugar | Citric | Vanilla | Cola | Caramel |
| --- | --- | --- | --- | --- | --- |
| Larger than 30 mesh | 1.20 | | | | 0.42 |
| Through 30 on 40 | 20.20 | 28.40 | 0.06 | | 0.60 |
| Through 40 on 60 | 43.66 | 47.00 | 6.32 | 0.06 | 0.90 |
| Through 60 on 80 | 15.86 | 14.20 | 7.40 | 1.00 | 0.98 |
| Through 80 on 100 | 9.44 | 7.80 | 9.64 | 1.58 | 2.40 |
| Through 100 on 200 | 4.70 | 1.80 | 26.28 | 15.20 | 46.00 |
| Through 200 | 0.40 | 0.20 | 45.58 | 81.60 | 47.20 |
| Dust (or lost) | 4.90 | 0.60 | 4.72 | 0.56 | 1.50 |
| Total | 100.00 | 100.00 | 100.00 | 100.00 | 100.00 |

TABLE II
Hot cola beverage formula variations (weight percent)

| Example numbers | 1 | 2 | 3 | 4 | 5 | 6 | 7 | 8 |
|---|---|---|---|---|---|---|---|---|
| Sucrose | 93.04 | 93.24 | 95.00 | 93.16 | 93.88 | 93.75 | 94.22 | 92.81 |
| Caramel color | 3.48 | 3.48 | 2.69 | 3.48 | 3.50 | 3.50 | 2.77 | 4.22 |
| Citric acid | 0.75 | 1.05 | 0.58 | 0.75 | 0.75 | 0.75 | 0.76 | 0.74 |
| Vanilla powder | 0.50 | 0.37 | 0.29 | 0.37 | 0.37 | 0.50 | 0.37 | 0.37 |
| Spray dried cola | 2.23 | 1.86 | 1.44 | 2.24 | 1.50 | 1.50 | 1.88 | 1.86 |
| Total | 100.00 | 100.00 | 100.00 | 100.00 | 100.00 | 100.00 | 100.00 | 100.00 |

In order to illustrate the compositions of the present invention, examples 1-8 are set forth in table II above. Each of the compositions in the examples, when added to hot water, yields a palatable hot cola beverage having a pronounced cola and citrus flavor and odor.

The present invention may be embodied in other specific forms without departing from the spirit or essential attributes thereof, and, accordingly, reference should be made to the appended claims, rather than to the foregoing specification as indicating the scope of the invention.

We claim:

1. A method of making a dry powder composition suitable for blending with heated water to form a hot cola beverage comprising the steps of providing a spray dried cola flavoring, vanilla powder, anhydrous citric acid, powdered caramel color, and sucrose in dry form and mixing the dry material in a relatively dry atmosphere.

2. A method according to claim 1 wherein the dry materials are mixed in a dry blender.

3. A method of making a dry powder composition according to claim 3 wherein said spray dried cola flavoring is provided in an amount of from 1.40 to 2.34 weight percent, said vanilla powder is provided in an amount of from 0.18 to 0.56 weight percent, said anhydrous citric acid is provided in an amount of from 0.37 to 1.13 weight percent, said powdered caramel color is provided in an amount from 2.62 to 4.36 weight percent, and said sucrose is provided in an amount from 85 to 95.4 weight percent, said weight percents being based on the total weight of the dry powder composition.

4. A method of making a dry powder composition according to claim 3 wherein said spray dried cola flavoring is provided in an amount of about 1.87 weight percent, said vanilla powder is provided in an amount of about 0.37 weight percent, said anhydrous citric acid is provided in an amount of about 0.75 weight percent, said powdered caramel color is provided in an amount of about 3.49 weight percent, and said sucrose is provided in an amount of about 93.52 weight percent.

* * * * *